Aug. 15, 1933.  W. A. DEL MAR  1,922,726
SHIELDED RUBBER INSULATED CABLE
Filed Aug. 19, 1932
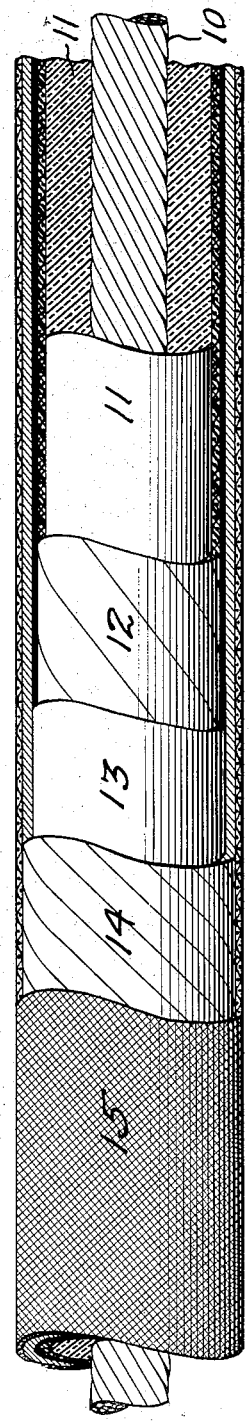
INVENTOR
William A. DelMar
ATTORNEY Patented Aug. 15, 1933

1,922,726

UNITED STATES PATENT OFFICE 1,922,726

SHIELDED RUBBER INSULATED CABLE

William A. Del Mar, Greenwich, Conn., assignor to Habirshaw Cable and Wire Corporation, New York, N. Y., a Corporation of New York Application August 19, 1932. Serial No. 629,457

3 Claims. (Cl. 173—264)

My invention relates to shielded rubber cables for use in the transmission of electrical current of high voltages and has for its object the production of a cable in which the ionizible space between rubber and the shield are obviated whereby the cable will be more efficient and will stand higher voltages.

A rubber insulated cable, covered with a metallic shielding tape does not have very good contact between the insulation and the shield and therefore ionization is likely to occur between them making the cable more liable to fail than if it were not shielded.

It has been proposed, in order to overcome this difficulty, that the rubber insulation be covered with a conducting coating of graphite or metallic paint, which would be in contact with the shield almost everywhere and would thus protect any air pockets which might exist from carrying the potential. This was found to be not practical as the graphite or metallic paint would cause trouble at the ends of the cable where the creepage surface from conductor to paint would be only the thickness of the insulation. Splicers could not be relied upon to clean off this paint and the shield would therefore be liable to carry the full voltage.

In order to overcome this difficulty, it is proposed to use a rubber filled or other adhesive tape, in contact with the rubber, and coat the outer surface of the tape with graphite or metallic paint.

This coating might itself serve as the shield, if made thick enough, but if a more substantial shield is desired, a copper or aluminum tape could be placed over the metallized rubber filled tape. Any air spaces which might exist between the metallized tape and the metal tape would, of course, be shielded from potential and would not ionize. There would be no air spaces between the rubber and shield because of the adhesiveness of the tape.

The foregoing and other features of my invention will now be described in connection with the accompanying drawing, forming part of this specification in which I have represented my shielded rubber insulated cable in its preferred form, after which I shall point out more particularly in the claims those features which I believe to be new and of my own invention.

In the drawing:—

Figure 1 is a view of my cable in part section.

In carrying out my invention I employ a conductor 10 insulated with the usual rubber insulation 11; around this is wrapped a rubber filled fabric or adhesive tape 12. I next employ a graphite or metallic conducting coating 13 on fabric tape 12. If this shielding tape is not sufficient for the voltages to be employed I may use a metallic shielding tape 14. Over this assembly the usual braid or covering 15 is placed.

I wish it distinctly understood that my shielded rubber insulated cable described and illustrated is in the form in which I desire to construct it and that changes or variations may be made as may be convenient or desirable without departing from the salient features of my invention and I therefore intend the following claims to cover such modifications as naturally fall within the lines of invention.

I claim:—

1. A shielded rubber insulated cable in which ionizable spaces between the rubber and shield are obviated by the use of an adhesive tape located between the rubber insulation and the shield and in contact with the rubber, the outer face of said adhesive tape being covered with metal.

2. The device of claim 1 with the addition of a metal tape over the metallized tape.

3. A shielded rubber insulated cable comprising a core of conducting material, covered with rubber insulation, adhesive tape in contact with the rubber and having an exterior conducting coating, metal shielding tape in contact with the coating whereby the ionizable spaces between the rubber and the shield are obviated, and covered with any mechanical protection.

WILLIAM A. DEL MAR.